July 13, 1943.   P. POLLACK   2,324,424
BATTERY PROTECTION AND INDICATING SYSTEM
Filed Oct. 28, 1939   2 Sheets-Sheet 1
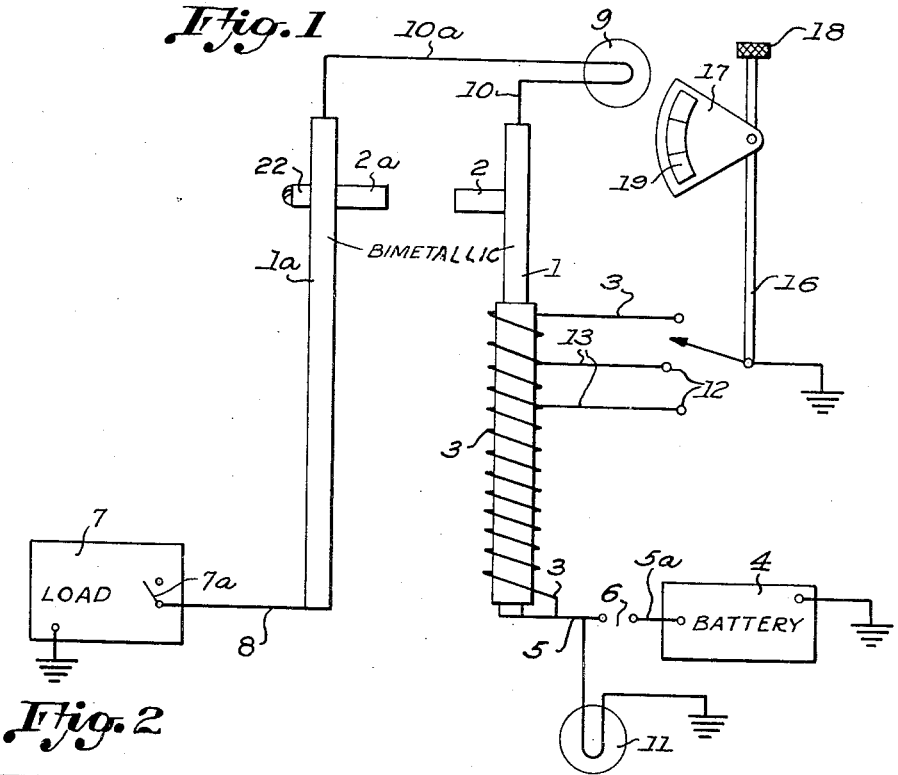
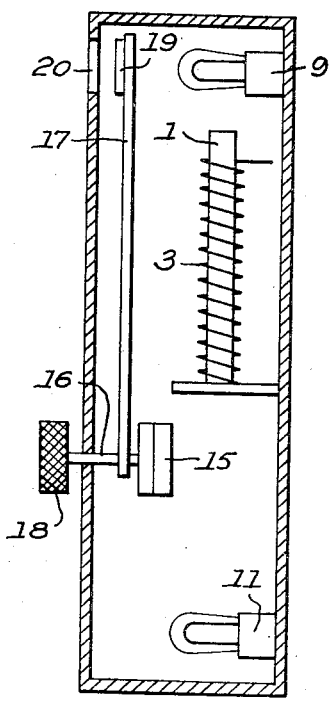
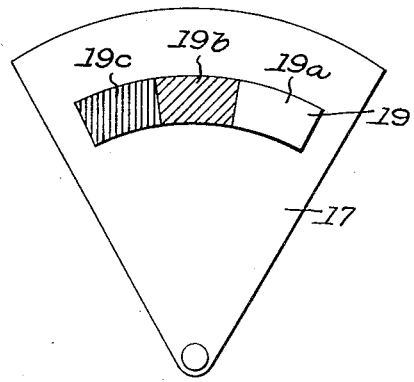
Inventor:
Paul Pollack July 13, 1943. P. POLLACK 2,324,424
BATTERY PROTECTION AND INDICATING SYSTEM
Filed Oct. 28, 1939   2 Sheets-Sheet 2

Inventor:
Paul Pollack

Patented July 13, 1943

2,324,424

UNITED STATES PATENT OFFICE 2,324,424

BATTERY PROTECTION AND INDICATING SYSTEM

Paul Pollack, Brooklyn, N. Y.

Application October 28, 1939, Serial No. 301,724

5 Claims. (Cl. 177—311)

At present the automobile is frequently equipped with a radio and other current consuming appliances such as heater, cigar lighter, fan and others. The automobile is not, however, provided with any automatic shut off device or signal to operate when the battery reaches a low voltage. In the absence of such device, the radio frequently runs down the battery, especially at night, when the lights are one, with resulting poor reception as well as motor starting trouble.

The objects of the invention are to prevent the radio or other current consuming appliances from running down the battery to such an extent as to interfere with motor starting, by providing an automatic shutoff for such radio or other appliances when the current potential of the battery reaches a predetermined low point and to provide an automatic signal when the battery has reached such a predetermined point.

These ends have been sought to be achieved by a device using a magnetic relay. The disadvantage of the use of such a relay is that it must consume a great deal of battery current and it is not durable or foolproof. Furthermore, the working of that device depends upon a tension spring which may be effected by atmosphere and corrosion and will require frequent readjustments.

It is the object of this invention to accomplish the desired result without any of the disadvantages of the other means thus far disclosed, and to provide an inexpensive, foolproof device which uses hardly any current in its operation and which, in addition, provides a signal or indicator of the battery condition.

The scope of this invention will be described with particular reference to the accompanying drawings and diagrams in which are disclosed the device embodying the novel features of the present invention, both alone and in a variety of installations. Like numerals refer throughout to similar parts which are presented by way of illustration only.

Figure 1 is a schematic embodiment of the invention and includes a wiring diagram of the assembly of the device with a radio, battery, switches and bulbs.

Figure 2 is a vertical cross section of the battery protective device.

Figure 3 is an elevational view of a portion of the invention, to wit, the dial.

Figure 4:
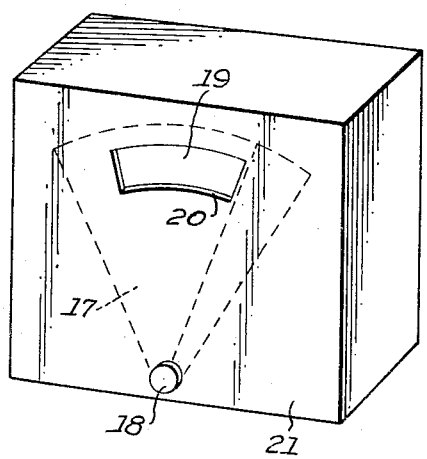
Figure 4 shows one form of receptacle in which the device might be enclosed.

The following is a detailed description:

On any suitable base are firmly mounted bimetal stems 1 and 1A. Near the top of the bimetal stems, contacts 2 and 2A are mounted and so positioned as to make and break contact with each other. Contact 2A is made adjustable by use of screw 22. Electric heat resistance element 3 is placed in association with bimetal stem 1. Stem 1 is connected to battery 4 by means of conductor 5 through switch 6 and conductor 5A. Stem 1A is connected to radio 7 through conductor 8 and radio switch 7A. One end of the electric heat resistance element 3 is grounded and the other end connected to conductor 5. Electric bulb 9 is connected in series to stems 1 and 1A by means of conductors 10 and 10A. Electric bulb 11 is connected to the battery through conductor 5 and switch 6 and conductor 5A. Tap 12 is imposed upon electric heat resistance element 3 and is connected by means of conductor 13 to switch 14 which is grounded.

In the particular embodiment of the invention shown in the drawings, Figure 1, it may be considered that the bimetal stem 1 is arranged so that the heat from the heat resistance element 3 will cause said bimetal stem 1 to bend toward the left causing contact between contacts 2 and 2A, and conversely, when heating element 3 is not sufficiently energized bimetal stem 1 will revert to original position, as shown in Figure 1, thus breaking contact.

While in the embodiment shown, bimetal 1 is actuated by means of heat element 3 wound around it, this invention is not limited to such means. The spirit of the invention is carried out, irrespective of whether the bimetal 1 is actuated by a heat element wound around it or positioned anywhere in association with the bimetal or by use of a filament so positioned as to reflect heat upon said bimetal or by any other means whereby the voltage in the battery will produce heat to which the bimetal stem 1 is made responsive.

When the device is combined with a radio and storage battery, as shown in diagram, Figure 1, it operates as follows:

When the device is switched on by closing switch 6, bulb 11 will light up. Simultaneously, bulb 9 will light up but only provided that radio 7 has been connected into the circuit and only so long as there is no contact between contacts 2 and 2a. The closing of switch 6 also serves to connect heating element 3 into the circuit. When heating element 3 is sufficiently energized, its heat will cause bimetal stem 1 to bend and make contact between contacts 2 and 2a. As soon as such contact is made, the current is shorted from electric bulb 9 into the radio.

Contact between contacts 2 and 2a will be made only if and when there is a predetermined amount of voltage in battery 4 and this will be controlled by the movement of the bimetal stem 1, as above described. When the current potential of the battery is reduced to or below the predetermined point, the bimetal stem 1 will move towards the right, contact between contacts 2 and 2A will thereby be broken, thus connecting in circuit with the radio 7, a current interrupting resistance in the form of the electric bulb 9 which becomes shunted across bimetals 1 and 1A and will light up. Bulb 9 thus serves as an indicator of the fact that the current potential of the battery 4 has dropped to the predetermined point and to explain why the radio has been in effect disconnected. It is thus apparent that the novel use of this shunting system to operate bulb 9 serves an important function. However, insofar as protecting the battery by automatically shutting off the radio is concerned, the invention would be effective without the use of the shunt and bulb 9.

Electric bulb 11 remains lit so long as switch 6 is in the contact position. Since the heating element 3 will continue to use electric energy so long as switch 6 is making contact, electric bulb 11 is employed as a pilot light to serve as a reminder to the user to turn off switch 6 when the radio is not in use.

The ignition switch of the automobile may be used in lieu of switch 6, in which event, bulb 11 will no longer be essential. Or, switch 6 may be combined with radio switch 7A so that by the operation of one switch the radio and the battery protective device will be switched on and off simultaneously. If this is done, pilot light 11 will likewise become nonessential. In any event, the use of light bulb 11 is optional and not absolutely essential to the principle of the invention.

It will be noted that in the embodiment shown, stems 1 and 1A are both of bimetal. The advantage of having both stems of bimetal is that any atmospheric variations are thereby avoided. It is not, however, absolutely essential that both stems be bimetallic and the device will operate although only stem 1 is bimetallic.

Taps 12 serve to reduce resistance in heating element 3. This reduction in resistance in heating element 3 will enable the battery to produce sufficient heat to actuate bimetal stem 1 with a predetermined lesser amount of voltage. One of the objects to be accomplished by the use of taps 12 is as follows:

When, during a radio broadcast, the current potential in battery 4 reaches the predetermined point and, by reason thereof, the radio is disconnected as above described, the user may, by the use of taps 12 and tap switch 15, reconnect the radio for an additional time until the current potential in the battery reaches a second and predetermined lower point. The use of such taps 12 and tap switch 15 will also serve as an indicator of the various states of charge in the battery. Without the use of a tap, electric bulb 9 would become illuminated only at one predetermined point. With the use of one tap, electric bulb 9 will become illuminated at two predetermined points. By providing a translucent dial with suitable symbols as hereinafter described, positioned in front of the electric bulb 9, which dial is attached to and rotates with the switch controlling the tap, there would be shown two different charge values of the battery. It is to be noted that the use of taps is not, however, absolutely essential to the principle of the invention.

Switches 6, 7A and 14 may be combined into one rotating multiple switch 15. Such a combination would avoid multiplicity of switches and prevent the use of the device except while the radio is in operation.

The device may be constructed with a rotating indicating dial, as is shown in Figure 3. Switch 15 is mounted on shaft 16. Dial 17 is firmly imposed on shaft 16 and both the dial 17 and the switch 15 are rotated by manually turning knob 18. A suitable indicator plate 19 divided into sections shown as section 19A, 19B and 19C, bearing appropriate symbols such as "Off," "Half charge" and "Recharge," is attached to dial 17.

The entire device may be inserted into a receptacle 21, such as is shown in Figure 4. Aperture 20 in this receptacle is so positioned in relation to indicator plate 19 that one of the sections 19A, 19B or 19C, on said plate 19 will be revealed and the others appear as knob 18 is rotated. The width of dial 17 in relation to width of receptacle is such as to allow for its rotation from one side to the other.

Indicator plate 19 may be constructed of translucent material and a suitable opening made in dial 17 to receive such indicator plate 19. Each section of indicator plate 19 may be in a different color; thus section 19A could be white, section 19B amber and section 19C red. More sections and colors may be employed, depending upon the number of taps used. The electric bulb 9 is placed in back of indicator plate 19 and aperture 20 so that it will illuminate the particular colored sections seen through aperture 20.

When the switch 15 is turned to the first contact position by manually turning knob 18, the dial 17 attached to shaft 16 will simultaneously move into position where the symbol on 19B will be visible through aperture 20. When the current potential of the battery drops below the first predetermined point, electric bulb 9 lights up and the symbol in 19B (amber, reading "Half charge") becomes illuminated. Thereafter, when the switch 15 is turned to the second contact position, in order to make use of the tap 12, the dial 17 will move simultaneously with the switch into position to make the symbol in 19C visible through aperture 20. When the current potential of the battery drops below the second predetermined point, electric bulb 9 lights up and the symbol in 19C (red, reading "Recharge") becomes illuminated. This is accomplished in the following manner:

When switch 15 is in the off position, the symbol in section 19A (white reading "Off") will be seen through aperture 20, but will be unilluminated. When knob 18 is turned to the first position, the symbol in section 19B will show through aperture 20, and will be momentarily illuminated by bulb 9. If the current potential of the battery is above the first predetermined point, contact between contacts 2 and 2A will be made and bulb 9 will be shorted out and contact made direct to radio 7 and bulb 9 will not light up again until the current potential of the battery 4 drops below such first predetermined point, at which time, contact between 2 and 2A is broken and the radio circuit will open, allowing the current to flow through bulb 9 and thus illuminate the symbol in section 19B (amber, reading "Half charge"), thereby indicating the reason why the radio has been disconnected.

If it is desired to continue the use of the radio, knob 18 is turned to throw switch 15 into the second position and the symbol on section 19C will then show through aperture 20, and will be momentarily illuminated by bulb 9. If the current potential of the battery 4 is above the second predetermined low point, contact will again be made between contacts 2 and 2A and bulb 9 will be shorted out and contact made direct to the radio and bulb 9 will not light up again until the current potential of the battery has dropped below such second predetermined point, at which time the radio circuit will again open, allowing the current to flow through bulb 9 and thus illuminate the symbol in section 19C (red, reading "Recharge").

While in the embodiment disclosed in Figure 1, the device is used in connection with a radio, it is to be understood that the invention is not limited to said use and that it may be used with any current consuming appliance or with a combination of such devices as, for instance, a cigar lighter, heater, electric fan, etc. Bulb 9 must have a higher resistance than such current consuming devices in order that the current be effectively interrupted.

Figure 5:
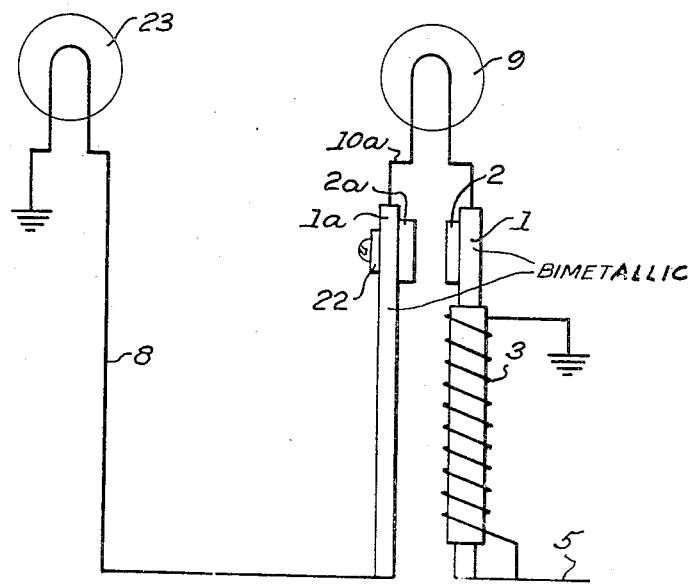
Figure 5 is a schematic embodiment of another form of the battery protective device, for use without any current consuming appliance, to indicate the condition of the battery.

Instead of a radio or other appliance, an electric bulb 23 may be substituted as is illustrated in diagram, Figure 5. Bulb 23 must have a lower resistance than bulb 9. In this form of the invention (Figure 5), the bulb 23 might be colored green or placed behind translucent green material bearing a symbol such as "Full charge." Whereas bulb 9 might be colored red or placed behind translucent red material bearing a symbol such as "Recharge." Bulb 23 acts in the same manner as above described with reference to radio 7 so that when the current potential in the battery 4 is more than the predetermined amount, bulb 23 will show. On the other hand, when the current potential drops below that point, bulb 9 will be energized.

When the invention is used in this manner, no switch is necessary and it may be connected to the lighting system of the automobile or to the radio to be operative by the lighting or radio switch thus being in operation only when current is being drawn from the battery.

It is to be understood that any electric signal device may be employed in place of an electric bulb.

It should also be understood that while certain features of the present invention have been more or less specifically described and illustrated, there are various changes which may be resorted to within the scope of the appended claims.

I claim:

1. In a switch and signal device, the combination of two bimetallic members, an electric resistance heating element in association with one of said members connected to the source and adapted to heat the said bimetallic member in response to a predetermined potential range of current from an electric source; the other bimetallic member being connected to the load; an electric bulb operably connected between said bimetallic members; a pair of contacts on said bimetallic members positioned to make contact and simultaneously short the said electric bulb when the current potential of the electric source is above a predetermined point; tap switch means whereby to vary the said predetermined point at which contact would be made, by reducing the resistance in the heating element; a conductor from one of the bimetallic members and heating element associated therewith; another conductor from the other bimetallic member; a switch position indicator and the said bulb positioned so as to illuminate the indicator.

2. In a switch and signal device, the combination of two bimetallic members, an electric resistance heating element in association with one of said members connected to the source and adapted to heat the said bimetallic member in response to a predetermined potential range of current from an electric source; the other bimetallic member being connected to the load; an electric bulb operably connected between said bimetallic members; a pair of contacts on said bimetallic members positioned to make contact and simultaneously short the said electric bulb when the current potential in the electric source is above a predetermined point; tap means whereby to vary the said predetermined point at which contact would be made, by reducing the resistance in the heating element; a conductor from one of the bimetallic members and heating element associated therewith; another conductor from the other bimetallic member.

3. In a switch and signal device, the combination of an electric thermal switch, one of its bimetallic members and heater being connected to the source and the other bimetallic member to the load, and the said electric thermal switch being responsive to a predetermined potential range of current from an electric source and adapted to open a circuit when said current potential reaches a predetermined point; tap means to vary the said predetermined point at which the circuit would open, by reducing the resistance in the said thermal switch; an electric bulb; connections between the terminals of the said electric bulb and the terminals of the electric thermal switch; conductor means for connecting said terminals into a circuit.

4. In an electric thermal switch, the combination of two bimetallic members, an electric resistance heating element in association with one of said members adapted to heat the said bimetallic member in response to a predetermined potential range of current from an electric source; the bimetallic member and heating element in association therewith being connected to the source and the other bimetallic member being connected to the load; conductors from said thermal switch; tap means to vary the predetermined potential range of current, by reducing the resistance in the heating element of said thermal switch; a current interrupting resistance in the form of an electric bulb operably connected across said thermal switch so as to be shunted into a circuit and light up when the thermal switch is open.

5. In an electric thermal switch, the combination of two bimetallic members, an electric resistance heating element in association with one of said members adapted to heat the said bimetallic member in response to a predetermined potential range of current from an electric source; the bimetallic member and heating element in association therewith being connected to the source and the other bimetallic member being connected to the load; conductors from said thermal switch; tap means to vary the predetermined potential range of current; by reducing the resistance in the heating element of said thermal switch a manual switch to operate the taps; a current interrupting resistance in the form of an electric bulb operably connected across said thermal switch so as to be shunted into a circuit and light up when the thermal switch is open; a switch position indicator and the electric bulb positioned so as to illuminate said indicator.

PAUL POLLACK.